(12) United States Patent
Lin et al.

(10) Patent No.: US 7,610,111 B2
(45) Date of Patent: Oct. 27, 2009

(54) METHOD AND SYSTEM FOR WAFER LOT ORDER

(75) Inventors: Cheng Lin, Singapore (SG); Nurulhuda Binte Jumahri, Singapore (SG)

(73) Assignee: TECH Semiconductor Singapore Pte Ltd, Singapore (SG)

( * ) Notice: Subject to any disclaimer, the term of this patent is extended or adjusted under 35 U.S.C. 154(b) by 452 days.

(21) Appl. No.: 11/705,636

(22) Filed: Feb. 13, 2007

(65) Prior Publication Data

US 2008/0195241 A1 Aug. 14, 2008

(51) Int. Cl.
*G06F 19/00* (2006.01)
(52) U.S. Cl. .................. 700/101; 700/100; 700/103; 700/108; 700/121
(58) Field of Classification Search ........... 700/99–104, 700/108, 109, 121
See application file for complete search history.

(56) References Cited

U.S. PATENT DOCUMENTS

| | | | |
|---|---|---|---|
| 5,818,716 A | 10/1998 | Chin et al. | |
| 5,841,677 A * | 11/1998 | Yang et al. | 702/176 |
| 6,470,231 B1 | 10/2002 | Yang et al. | |
| 6,763,277 B1 | 7/2004 | Allen, Jr. et al. | |
| 6,941,183 B1 * | 9/2005 | Huang et al. | 700/101 |
| 7,020,594 B1 | 3/2006 | Chacon | |
| 7,027,885 B1 | 4/2006 | Barto et al. | |
| 7,151,972 B2 * | 12/2006 | Denton et al. | 700/99 |
| 2005/0234578 A1 | 10/2005 | Liu et al. | |

* cited by examiner

*Primary Examiner*—Sean P Shechtman
(74) *Attorney, Agent, or Firm*—Saile Ackerman LLC; Stephen B. Ackerman

(57) ABSTRACT

Methods and systems for wafer lot ordering using including estimation of allowable queue time based on utilization loss and rework percentage have been achieved. The method invented comprises steps of ranking lots, allocating equipment to the exit step of queue time, calculating and determining the optimal allowable queue time based on utilization loss and rework percentage, calculating the next available time for equipment, calculating earliest release time, and releasing lot/batch and pre-assign it to the equipment at exit step. The present invention can be applied to other manufacturing lines than semiconductor manufacturing.

26 Claims, 6 Drawing Sheets

METHOD AND SYSTEM FOR WAFER LOT ORDER

BACKGROUND OF THE INVENTION (1) Field of the Invention

This invention relates to methods and systems for controlling a semiconductor manufacturing line. In particular, the invention relates to method and systems determining the optimal queue time based on utilization loss and rework percentage being dependent upon wafer lot order.

(2) Description of the Prior Art

In semiconductor manufacturing, cycle-time is a most critical factor. Cycle-time can be defined as the sum of processing time and queue time. The queue time represents the time difference between the time when a wafer or lot leaves a process step and the time when it enters the next process step. While the processing time is defined by the type of process tools used in a manufacturing line the queue time can be influenced by manufacturing line control methods as e.g. managing the order of wafer lots.

In semiconductor manufacturing, queue time (or time window) control is commonly implemented between processes. The selected queue time may affect the materials applied to a semiconductor substrate, as well as electrical properties of a device being formed. The control of queue time is implemented for known time-sensitive process steps that are commonly discovered by experimentation or general knowledge of the manufacturer (e.g. through experience). Such approach is highly dependent on the human judgment and does not take into consideration utilization loss and rework percentage. In view of this, there is a need for a wafer lot order method that takes into consideration utilization loss and rework percentage for time window control.

Prior art patent documents, U.S. Patent (U.S. Pat. No. 6,470,231 to Yang et al.), U.S. Patent (U.S. Pat. No. 7,027,885 to Barto et al.), and U.S. Patent Publication (US 2005/0234578 to Liu et al.) disclose queue time control. U.S. Patent (U.S. Pat. No. 6,470,231 to Yang et al.) teaches a dispatching system and method. In the lot order algorithm of this prior art, each wafer is dispatched to an available tool in accordance to scheduled output, wherein the output of each tool must be maximized and wafer with higher priority have to be processed first. Although queue time was mentioned in the ranking algorithm in this prior art, an approach of determining the optimum allowable queue time based on utilization and rework percentage is not disclosed in this prior art. U.S. Patent (U.S. Pat. No. 7,027,885 to Barto et al.) relates to a technique by which a manufacturing process flow determines when to begin processing a batch of lots. U.S. Patent Publication (US 2005/0234578 to Liu et al.) discloses a method and system for identifying process steps for queue-time control and abnormality detection.

Furthermore there are more patents in the field of dispatching wafer lots of a semiconductor manufacturing lines:

U.S. Patent (U.S. Pat. No. 7,020,594 to Chacon) proposes an integrated wafer fab production characterization and scheduling system incorporating a manufacturing execution system with a scheduling system based on simulation. The integrated characterization/scheduling system provides manufacturing with a simulation tool integrated with the manufacturing execution system to evaluate proposed production control logic as a practical alternative to expensive experimentation on actual production system. Furthermore, simulation models are used to create short-term dispatch schedules to steer daily manufacturing operations towards planned performance goals. Innovative features include integration of preventive maintenance scheduling, Kanban based WIP control, an integrated time standard database, a, and real time lot move updates.

U.S. Patent (U.S. Pat. No. 6,763,277 to Allen, Jr. et al.) discloses a method, apparatus, and system provided for a proactive dispatch system to improve line balancing. At least one request for processing a semiconductor wafer is received. A line-balancing analysis based upon the request is performed. At least one semiconductor wafer based upon the line-balancing analysis is processed.

U.S. Patent (U.S. Pat. No. 5,818,716 to Chin et al.) discloses a semiconductor manufacturing fabrication plant with production to-order type operation having hundreds of devices and various processes to be managed. To provide short cycle time and precise delivery to satisfy customer expectations is a major task. A dispatching algorithm named "Required Turn Rate (RTR)" functions according to the level of current wafers in process (WIP) algorithm revising the due date for every lot to satisfy the demand from Master Production Scheduling (MPS). Further the RTR algorithm calculates the RTR of each lot based on process flow to fulfill the delivery requirement. The RTR algorithm determines not only due date and production priority of each lot, but also provides RTR for local dispatching. The local dispatching systems of each working area dispatch the lots by using required turn rate to maximize output and machines utilization.

SUMMARY OF THE INVENTION

A principal object of the present invention is to automate the wafer lot order process at gate step of a semiconductor manufacturing line.

Another principal object of the present invention is to improve manufacturing efficiency.

A further object of the present invention is to save manpower required to manually order production lots.

Another object of the present invention is to reduce utilization loss and rework by achieving optimal lot order.

In accordance with the objects of this invention a method to establish a wafer lot order of a semiconductor manufacturing line by controlling queue time of wafer lots has been achieved. The method invented comprises comprising the steps of (1) ranking lots of semiconductor wafers waiting at gate step of queue time and order said ranked list on a lot list, (2) allocating equipment to an exit step of queue time control and ranking said equipment according priority on an equipment list, (3) selecting an equipment having highest priority as current equipment, and (4) selecting a lot having highest priority. The following steps of the method invented are (5) checking a resource and process constraint database if said equipment selected is qualified to run said lot selected and if resources required are available and select another equipment as current equipment from said equipment list if said check is negative, (6) determining optimal allowable queue time of said lot selected based on utilization loss and rework percentage, (7) calculating the earliest release time for equipment selected; and, finally, (8) releasing lot selected and assigning it to the equipment selected if current time is not later than calculated earliest release time otherwise select next lot on the lot list and go to step (5), if there are no more lots on the lot list go to exit.

In accordance with the objects of this invention a system to establish a wafer lot order of a semiconductor manufacturing line by controlling queue time of wafer lots has been achieved. The system invented comprises, first, means to create a list of all production lots waiting at a gate step of queue time control, wherein said lots are ranked according their priority, means to create a list of all manufacturing equipments allocated to exit steps of queue time control, wherein said equipments are ranked according their priority, and means of a resource and process constraint database, which is used to check if said manufacturing equipments are qualified to run a production lot and if said equipment has production resources required for said lot. Furthermore the system invented comprises means to determine optimal allowable queue time by running simulation with different allowable queue time settings of said production lots considering utilization loss and rework required, means to calculate earliest release time for production lots based on said optimal. allowable queue time and based on calculated next available time of exit equipment, and means to release and to assign production lots to manufacturing equipment.

BRIEF DESCRIPTION OF THE DRAWINGS

In the accompanying drawings forming a material part of this description, there is shown.

DESCRIPTION OF THE PREFERRED EMBODIMENTS

The preferred embodiments disclose methods and systems to establish a wafer lot order to control the queue time, i.e. the difference between the time when a wafer or lot leaves a process step and the time when it enters the next process step. This control of queue time involves estimation of optimal queue time based on utilization loss and rework percentage.

The present invention discloses methods and systems to automatically order lots or batches of lots at gate step of queue time control for equipment at exit step of queue time control with the objective of minimizing rework and utilization loss. The gate step of queue time control represents the point of time when a wafer or lot/batch leaves a process tool; the exit step of queue time control represents the point of time when a wafer or lot/batch enters a next process step.

Figure 1:
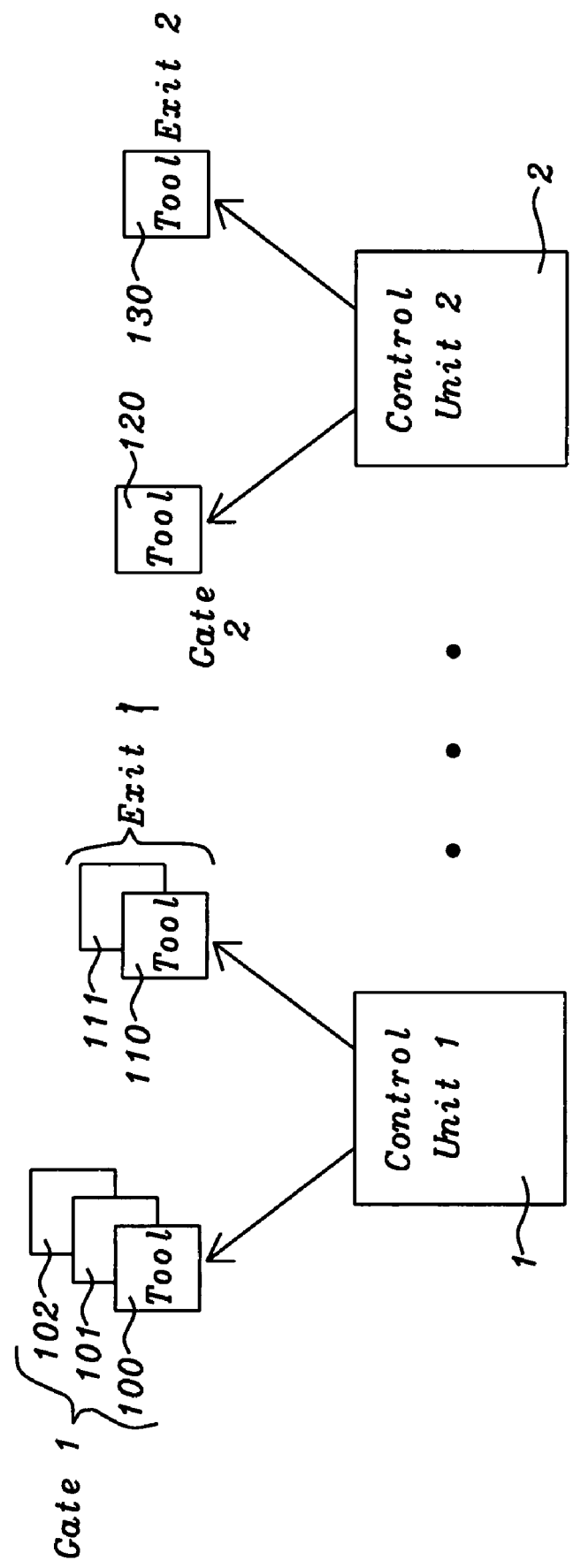
FIG. 1 shows the basic components of the system of present invention.

FIG. 1 shows the basic components of the present invention. Semiconductor wafers are processed through a series of process steps/tools. A small number out of a multitude of these process steps/tools are indicated in FIG. 1, as e.g. by gate1, exit1, gate2 and exit2, which can be classified into categories as e.g. photolithography, etching, ion implantation, diffusion, deposition and etc. These process steps are performed e.g. by process tools 100-102, 110-111, 120 and 130. For the sake of clarity only very few process tools are shown in the example of FIG. 1. Very often more than one process tools are provided for one process step as e.g. process tools 100-102 and 110-111 shown in the example of FIG. 1. Very often wafers are grouped into lots and processed as lots and, furthermore, eventually, lots of wafers are grouped into batches and processed by the batch as e.g. in a furnace. FIG. 1 illustrates a preferred embodiment of the invention, wherein decentralized queue time control units 1 and 2 control queue time between pairs of a gate step and an exit step. These control units are either powerful PCs or minicomputers. FIG. 1 shows as example a first pair, controlled by control unit 1, comprising gate1 with process tools 100-102 and exit1 with process tool 110-111, and a second pair, controlled by control unit 2, comprising gate2 with tool 120 and exit2 with tool 130. In this preferred embodiment of the present invention queue time is controlled decentrally for each pair of gate step and exit step, having time constraints. For process steps without time constraints queue time control is not applied. It should be understood that a central queue time control using one control unit only for a manufacturing line as a whole could be deployed as well.

A queue time control unit as e.g. control unit 1 orders lots at its gate step, which is gate1, i.e. process tools 100-102 in the example of FIG. 1, in order to dispatch these lots/batches to following process tools 110-111 that are available and capable to process the lots/batches.

Figure 2:
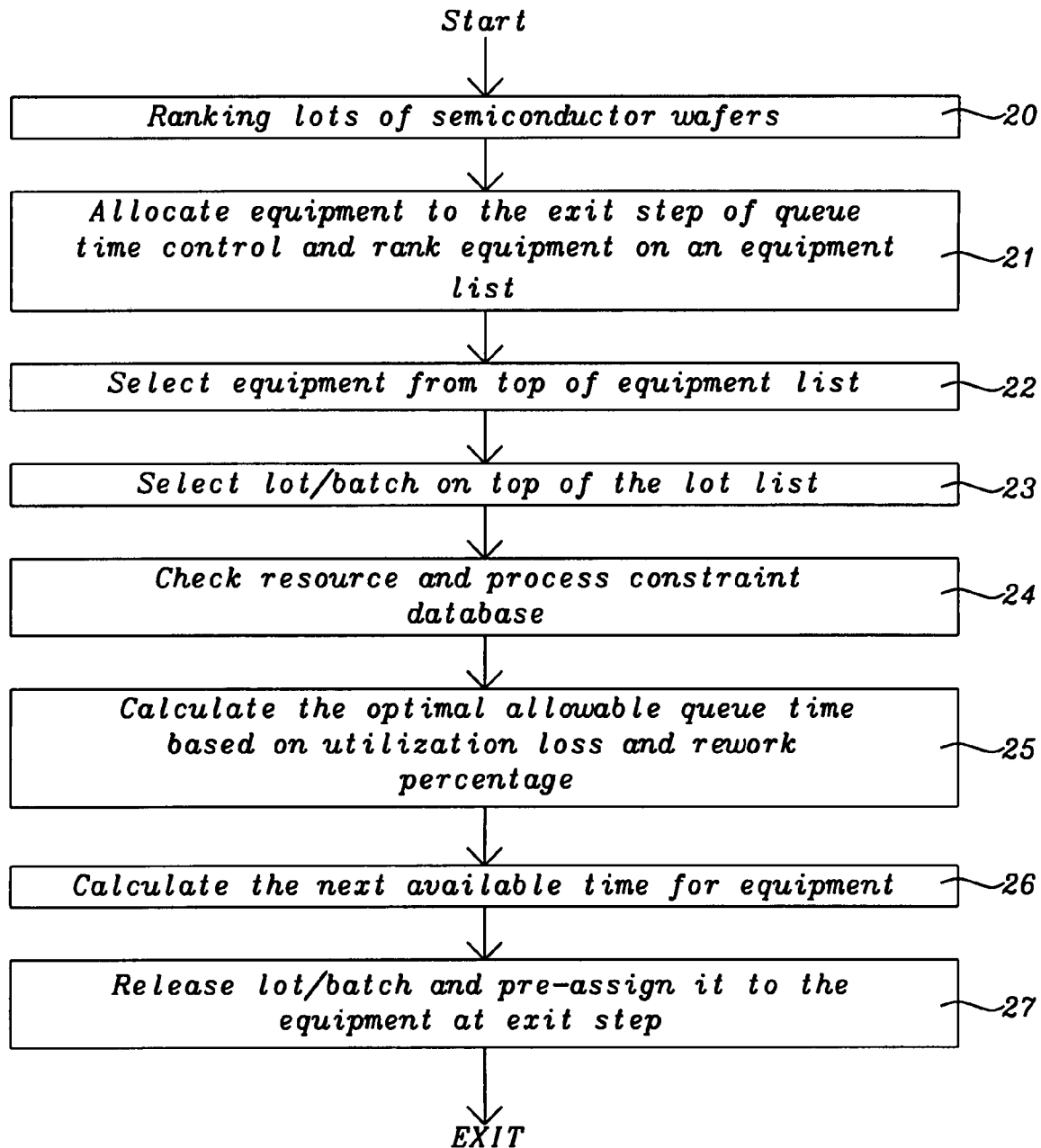
FIG. 2 illustrates a flowchart depicting a high-level view of method steps for lot order of semiconductor wafers using queue time control.

FIG. 2 is a block diagram depicting a high-level view of lot order of semiconductor wafers using queue time control. In step 20 all lots or batches of semiconductor wafers, comprising several lots, are ranked by a lot ranking algorithm and ordered on a lot list. Step 21 describes the allocation of equipment to the exit step of queue time control inclusive a ranking of the equipment on an equipment list and in step 22 the equipment on top of the equipment list is selected. The lot/batch on top of the lot list is selected in step 23 followed by a check of a resource and process constraint database in step 24 in order to make sure that the equipment selected is qualified and resources as e.g. process material, reticles etc. are available. In a next key step 25 the calculation of the optimal allowable queue time based on utilization loss and rework percentage is illustrated. In step 26 the next available time for the equipment is calculated and, finally, in step 27 the lot/batch selected is released and pre-assigned to the equipment selected at exit step of the queue time control.

Figure 3:
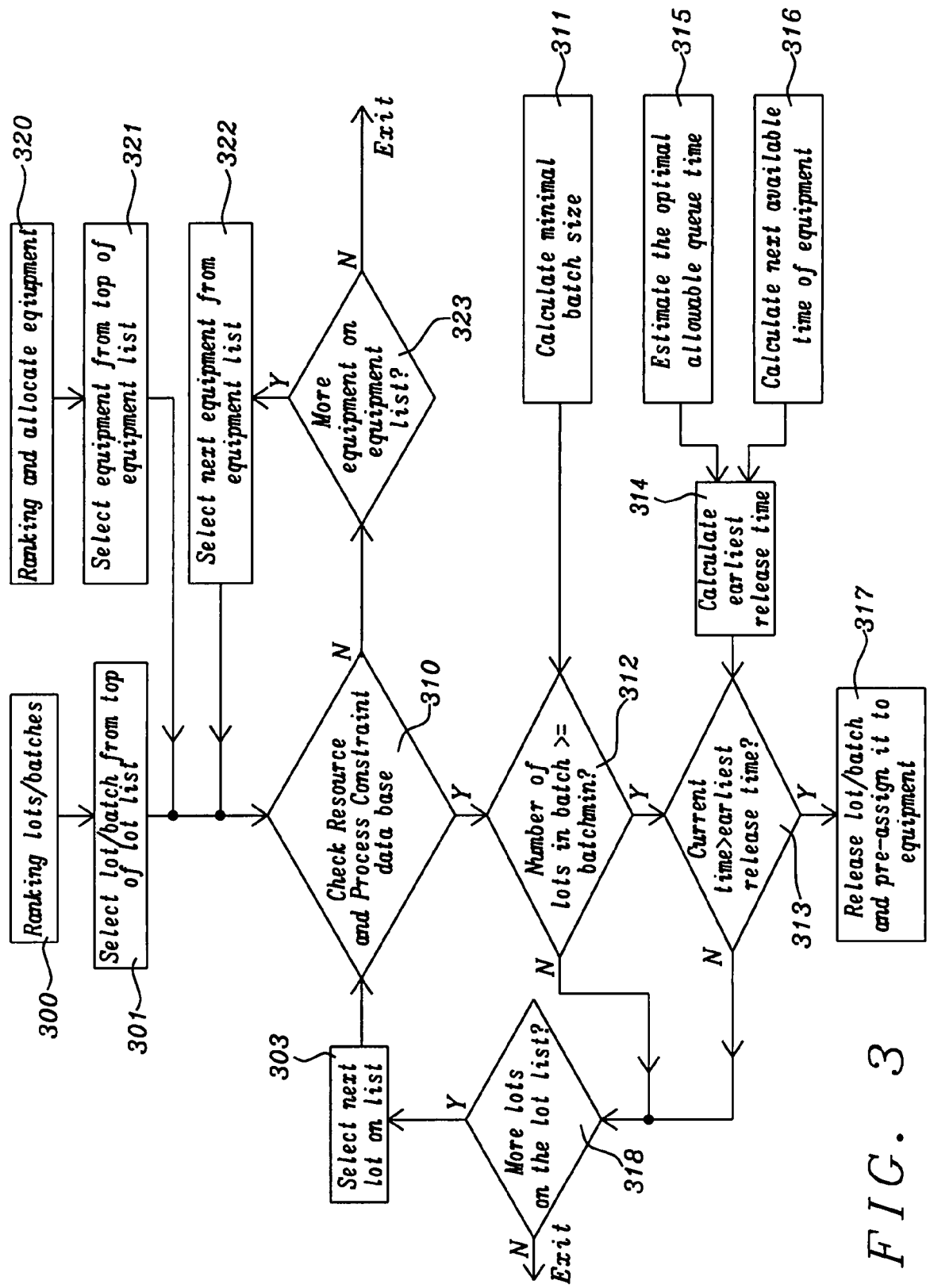
FIG. 3 shows a flowchart depicting in more details the lot order at gate step of queue time control.

FIG. 3 is a block diagram depicting in more details the lot order at gate step of queue time control. In step 300 all lots, or batches comprising several lots, are ranked by a lot-ranking algorithm. The lot ranking algorithm of a preferred embodiment is a composite rule of Bottleneck Pull rule and Output Driven rule, but it could be replaced by any other ranking algorithm. The algorithm is installed in a Real Time Dispatching System. The information required by this lot ranking algorithm is received get from MES system as e.g. WIP Info and from planning input as e.g. planned cycle-time and Output Plan.

The ranking algorithm of step 300 creates a lot list comprising all the production lots/batches waiting at gate step of a queue time control ranked by this algorithm. If the exit step is a batch process, the lots will be further assigned to batches, and the batch priority is equal to the highest priory of the lots that belong to the batch.

The equipment allocation and ranking algorithm of step 320 will firstly remove the equipment that is down or going to undergo preventive maintenance (PM) after finishing lots already assigned to it from the queue time control unit controlling the related exit step of queue time control. The equipment allocation and ranking algorithm is installed in a Computer Integrated Manufacturing System. The Equipment allocation algorithm receives the information required from a Real Time Dispatching System and from a MES system.

The equipment allocation algorithm will then allocate equipment via the related queue time control unit controlling the exit step to different manufacturing process steps based on the wafer move target for each manufacturing process step if the queue time control unit is running multiple process steps. Meanwhile it also determines the ranking of the equipment at each process step. The number of equipment allocated for each process step is determined as a non-limiting example by the wafer move target and available WIP. Wafer move target is the difference between target downstream WIP required to meet the output target and actual downstream WIP. Other algorithms would be possible as well.

The equipment allocation and ranking algorithm of step 320 creates a list of equipment assigned to run the exit step of queue time control. In step 321 the equipment at top of the equipment list is selected as "current" equipment.

In step 301 the lots/batches are selected according to the sequence of the lot list, i.e. each time the equipment at the exit step with highest priority is also selected in step 321. Step 310 checks whether the equipment selected as "current" equipment is qualified to run the lot selected and whether it is available.

In case the check of step 310 is positive the process flow of the method invented goes to step 312, wherein a check is performed whether the number of lots in the batch could satisfy the minimum batch size requirement calculated by the batching algorithm program 311. The batching algorithm uses the information of future lots arrivals to determine optimal batch size to minimize the average waiting cost. Normally this algorithm runs at the furnace step, but if the furnace step happens to be the exit step of queue time, this algorithm will run at gate step of the queue time.

In case the result of the check of step 310 is negative, i.e. the equipment selected is not qualified to run the current lot selected or it is not available, the method flow goes to step 323 in order to check if there is more equipment on the equipment list. In case the check of step 323 is positive, i.e. there is more equipment on the equipment list, the next equipment of the equipment list is selected as "current" equipment in step 322 and the method flow goes to step 310. In case the check of step 323 is negative, i.e. there is no more equipment on the equipment list; the process flow goes to exit. The process flow is resumed with step 300 if another lot/batch appears at gate step or the process flow resumes with step 320 if there are any changes related to availability of tools of equipment at exit step.

In case the check of step 312 is negative, i.e. the number of lots in the current batch is smaller than the minimum batch size calculated by batching algorithm program 311 the method flow goes to step 318, wherein a check whether there are more lots/batches in the lot list created by step 200 is performed.

In case the check of step 318 is negative, i.e. there are no more lots/batches in the lot list of step 300, the method flow goes to exit. In case there are still lots/batches in this list the next lot of the lot list is selected as current lot in step 303 and the method flow goes to step 310 again.

When both checks of step 310 and step 312 are positive, a next check is performed in step 313 in order to check whether the current time is later than the suggested earliest release of the current lot/batch. If current time is earlier, there will be no action taken on the lot/batch and the method flow will go to step 318 and if the check of step 318 is positive the next lot/batch of the lot list will be selected as current lot in step 303 and the method flow will go to step 310 again.

In case the current time will be in step 313 greater (later) than the earliest release time the current lot/batch will be released at gate of queue time control in step 317. Meanwhile it is also pre-assigned to the current equipment selected either in step 321 or in step 322 at exit of time queue. "PRE-ASSIGN" means the lot/batch at gate is assigned to the equipment at exit step even though it has not reached the exit yet. This assignment will not change when lot/batch arrives at exit unless the equipment accidentally goes down by then.

The earliest release time is required for input to step 313. Earliest release time calculation consists of 3 main components, namely steps 314-316. Step 315 describes an off-line simulation to estimate the optimal allowable queue time, step 316 represents an algorithm to calculate the next available time of the "current" equipment based on equipment run mode, raw process time and number of lots assigned, and step 314 describes the algorithm to calculate the earliest release time using the outputs of steps 315 and 316. Using both allowable queue time and next available time of the exit tool, step 314 calculates the earliest release time for gate step of queue time control.

Figure 4:
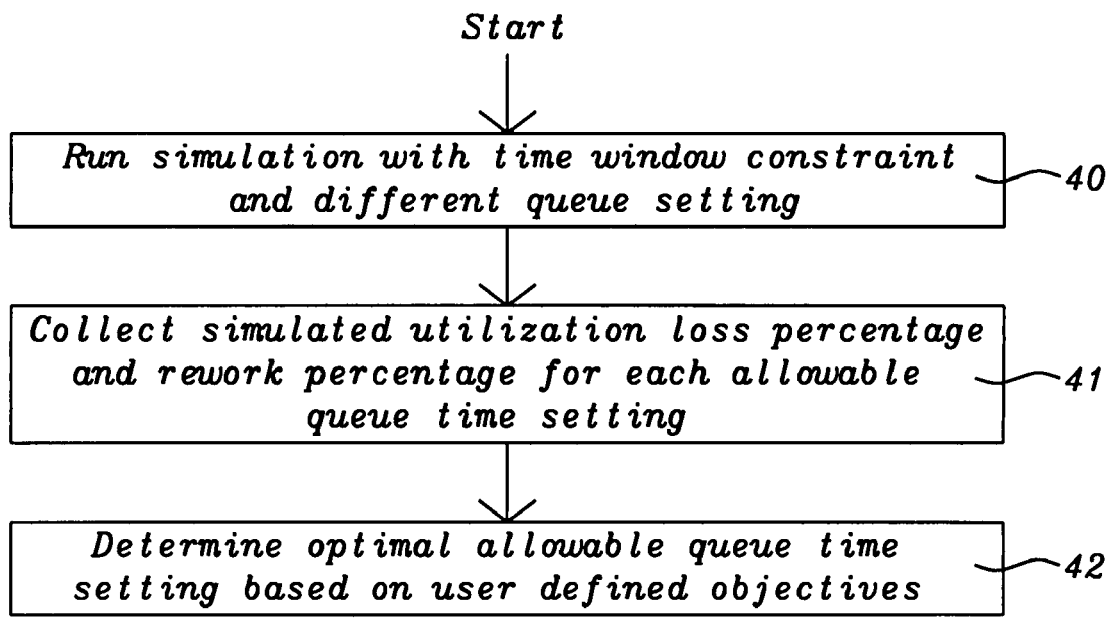
FIG. 4 illustrates a flowchart detailing the offline simulation to estimate the optimal allowable queue time.

FIG. 4 depicts more details of step 315, i.e. the offline simulation to estimate the optimal allowable queue time. In the preferred embodiment of the present invention described an offline simulation is performed by a planner on a separate PC with the assumption that the lot arrival rate is 100% of the capacity of Exit Step. "Offline" means that a real time WIP profile is not used to run the simulation. An online simulation is also possible; just that it requires the real time WIP profile and equipment state fed to simulation model.

In step 40 an offline simulation program will run simulation experiments for different allowable queue time settings based on the tool set configuration, unscheduled down distribution and collect the simulation results on utilization loss percentage and rework percentage. In step 41 the simulated utilization loss percentage and rework percentage as function of each allowable queue time setting is collected as shown in FIG. 5.

Figure 5:
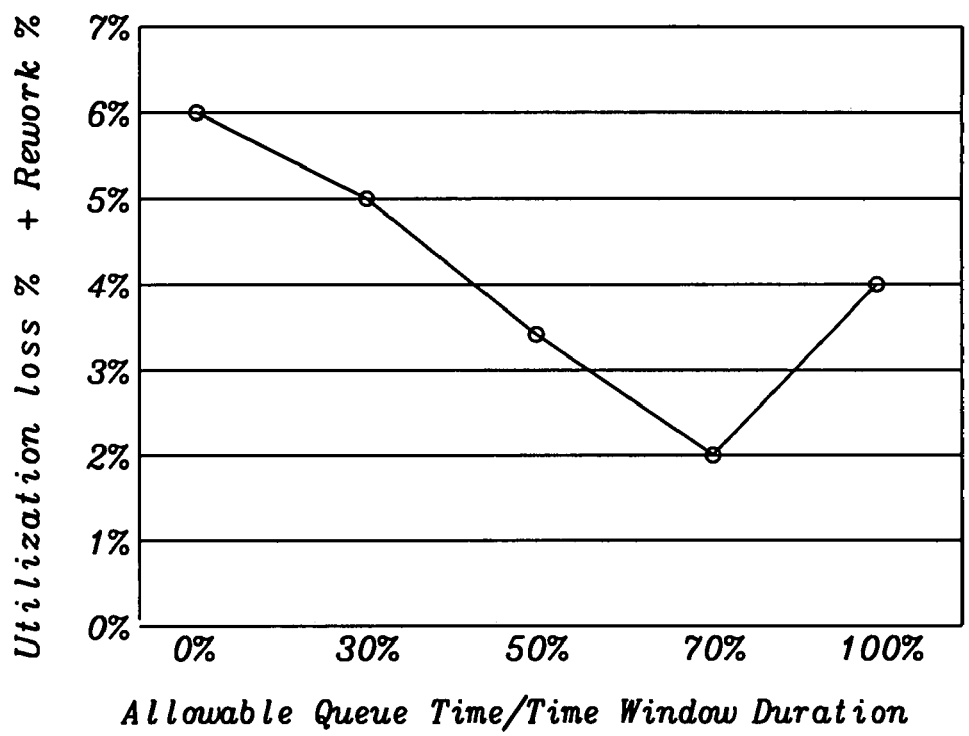
FIG. 5 illustrates an example of the sum of utilization loss percentage plus rework percentage versus allowable queue time duration.

FIG. 5 illustrates an example of the sum of utilization loss percentage plus rework percentage versus allowable queue time duration as result of step 41. In step 42 the optimal allowable queue time will be selected according to the user defined Objective function (weightage of utilization loss percentage+weightage rework percentage), and fed to block 314.

The purpose of the Objective function is to define the trade-off between utilization loss % and rework %, which is determined by Manufacturing and capacity planning. For those queue time steps, which cannot afford rework percentage, the rework percentage will be given high weightage in the objective function. For those queue time steps with very tight capacity, the utilization loss percentage will be given high weightage in the objective function.

Returning to FIG. 3, step 316 describes the calculation of the next available time for each equipment based on the remaining process time for the current lot/batch, arrival time and process time of each lot/batch assigned to it.

Figure 6:
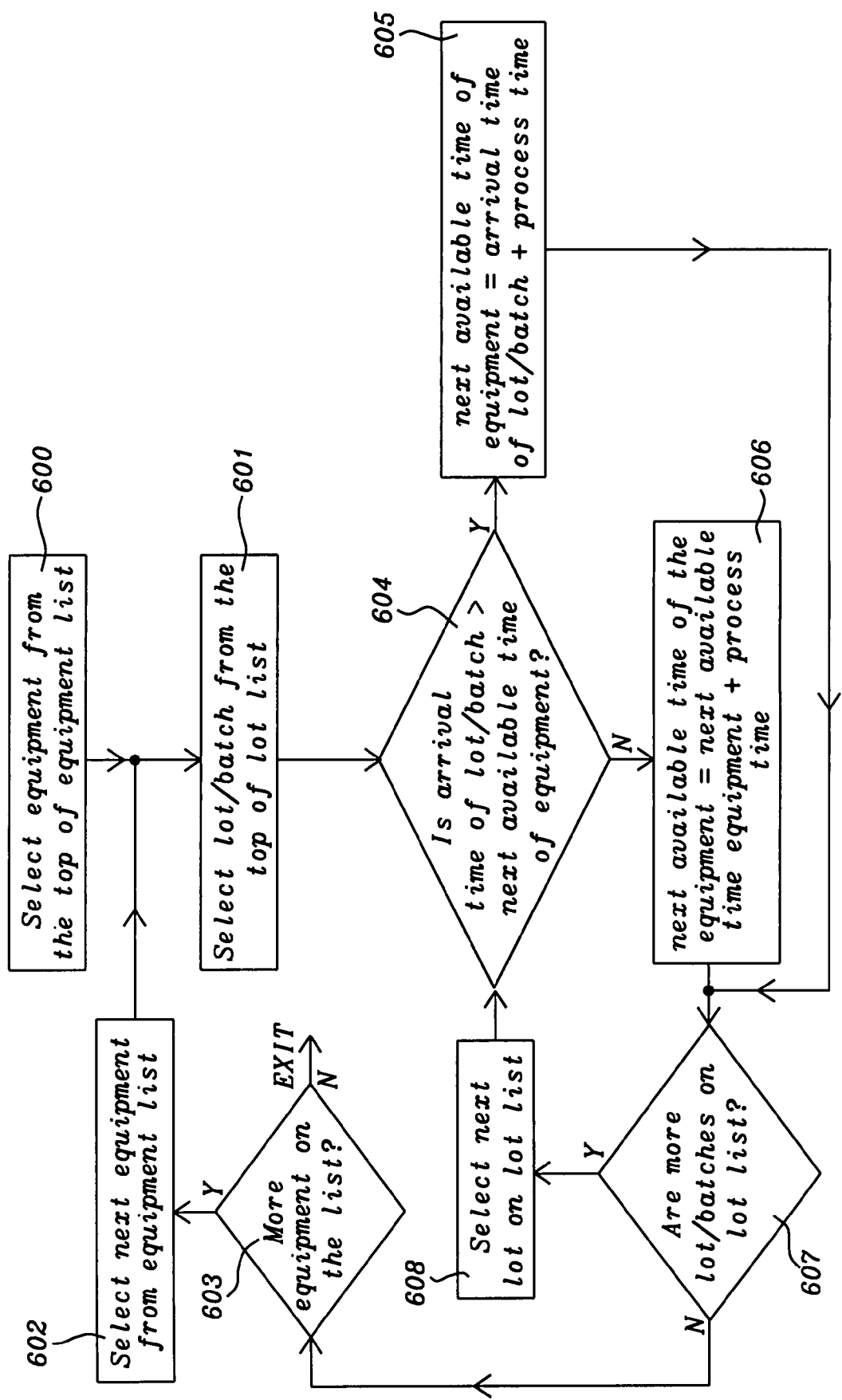
FIG. 6 depicts more details about the calculation of next available time of manufacturing equipment at exit step of queue time control.

FIG. 6 depicts more details about step 316, i.e. a calculation of next available time of manufacturing equipment at exit step of queue time control. In step 600 the equipment from top of the equipment list is selected as "current" equipment and in step 601 the lot/batch from top of the lot list is selected as "current" lot. In step 604 the arrival time of the "current" lot/batch is compared with the next available time of the "current" equipment. In case the "current" lot/batch arrives earlier than the "current" equipment becomes available, the next available time of the "current" equipment will be calculated in step 606 by increasing the next available time of the equipment by the raw process time of the "current" lot/batch, otherwise, in step 605, the next available time of the "current" equipment will be equal to arrival time of next lot/batch plus the raw process time of the "current" lot/batch.

After the calculation of the next available time of the "current" equipment in either step 605 or in step 606 the method flow continues to step 607.

In step 607 is a check if there are more lot/batches on the lot list. If positive, the next lot on the lot list is selected as "current" lot in step 608 and the method flow goes again to step 604.

In case the check of step 607 results negative, i.e. there is no more a lot/batch on the lot list, the method flow goes to step 603 in order to check if there is more equipment on the equipment list. If positive, the next equipment on the equipment list is selected as "current" equipment in step 602 and the method flow goes again to step 601.

By the method shown in FIG. 6 for each equipment and each lot/batch assigned to the equipment the next available time of an equipment is calculated by comparing the arrival time of each lot/batch with the next available time of the equipment and setting the available time accordingly.

Figure 7A:
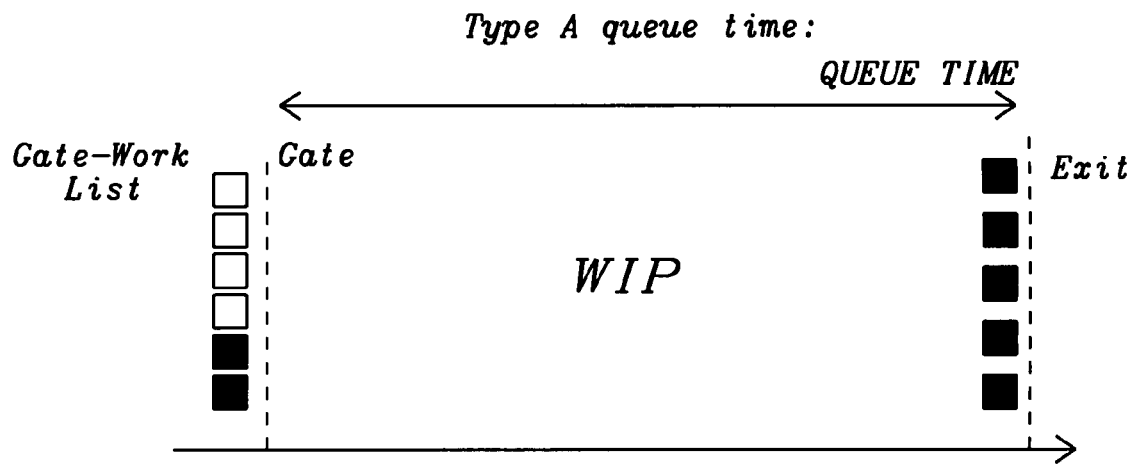
FIGS. 7a-c illustrate more details of the calculation of the earliest release time depending upon different types of queue time.
Figure 7B:
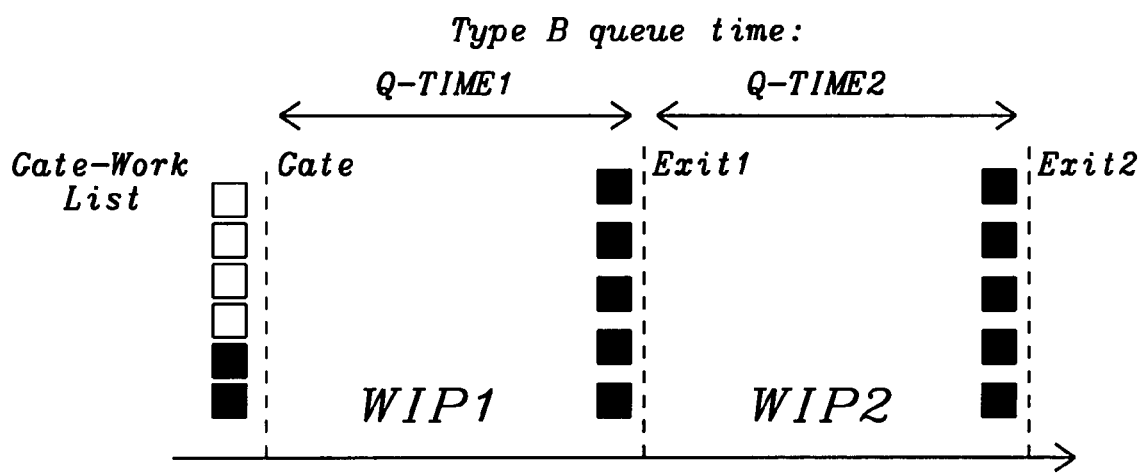
Figure 7C:
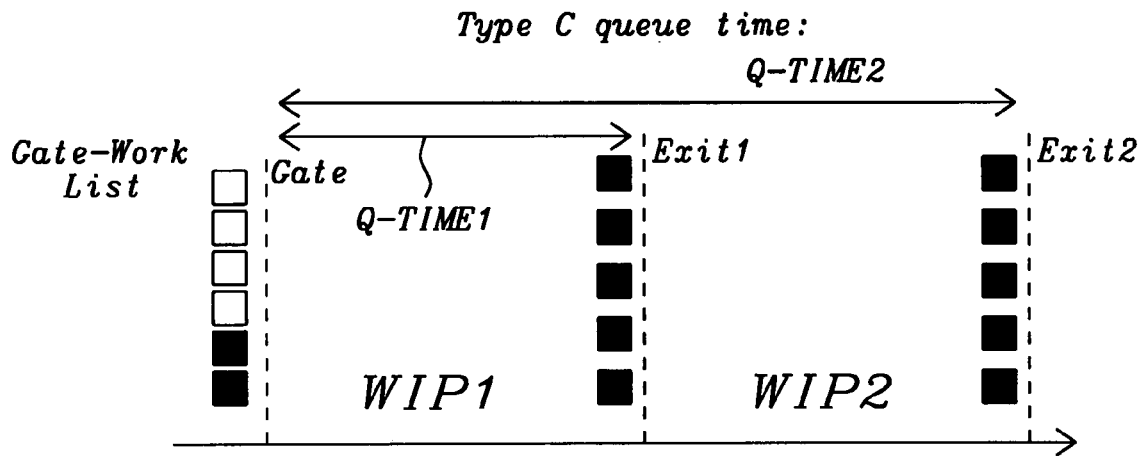

FIGS. 7a-c illustrate more details of the calculation of the earliest release time depending upon different types of queue time. There are mainly three types of queue time. FIG. 7a describes a type A queue time. FIG. 7a indicates the work list of a gate tool, an exit tool, and work-in-process (WIP) waiting for the exit tool. The earliest release time (ERT) for type A queue time is calculated straightforward using the equation $$ERT(A)=NAT-RPT-AQT,$$

wherein NAT represents the next available time for exit tool, RPT represents the raw process time of the gate tool and AQT represents the allowable queue time. Type A queue type is characterized by having one allowable queue time and requiring a next available time of one step only.

FIG. 7b describes a type B queue time. FIG. 7b indicates the work list of a gate tool, an exit tool1 (ET1) and an exit tool 2 (ET2), work-in-process (WIP1) waiting for exit tool1 (ET1) and work-in-process (WIP2) waiting for exit tool 2 (ET2). Type B earliest release time needs to consider next available time of each exit to make sure the lot will not violate any one of the queue time constraints. The earliest release time (ERT) for type B queue time is calculated using the equation:

$$ERT(B)=\max(\text{release time 1, release time 2}),$$

wherein
release time $1=NAT(ET1)-RPT-AQT1$, and
release time $2=NAT(ET2)-AQT1-RPT(1)-RPT-AQT(2)$,
wherein NAT(ET1) represents the next available time for exit tool1, NAT(ET2) represents the next available time for exit tool2, RPT represents the raw process time of the gate tool, RPT(1) represents the raw process time of exit tool 1, AQT(1) represents the allowable queue time between gate and exit tool 1, and AQT(2) represents the allowable queue time between exit tool 1 and exit tool 2. Type B queue type is characterized by having two allowable queue time between gate and exit tool 1 and between exit tool 1 and exit tool 2, therefore requiring the next available points of time of two steps.

FIG. 7c describes a type C queue time. FIG. 7c indicates the work list of a gate tool, an exit tool1 (ET1) and an exit tool2 (ET2), work-in-process (WIP1) waiting for exit tool1 (ET1), and work-in-process (WIP2) waiting for exit tool2 (ET2). Type C earliest release time needs to consider next available time of each exit to make sure the lot will not violate any one of the queue time constraints. The earliest release time (ERT) for type C queue time is calculated using the equation:

$$ERT(C)=\max(\text{release time 1, release time 2}),$$

wherein
release time $1=NAT(ET1)-RPT-AQT(1)$, and
release time $2=NAT(ET2)-RPT-AQT(2)$,
wherein NAT(ET1) represents the next available time for exit tool1, NAT(ET2) represents the next available time for exit tool2, RPT represents the raw process time of the gate tool, AQT(1) represents the allowable queue time between gate and exit tool 1, and AQT(2) represents the allowable queue time between gate and exit tool 2. Type C queue type is characterized by having two allowable queue times between gate and exit tool 1 and between gate and exit tool 2, therefore requiring the next available points of time of two steps.

For type B and C queue time, earliest release time needs to consider next available time of each exit tool to make sure the lot will not violate any one of the queue time constraint.

The calculation can be easily extended to handle other types of queue time as long as the next available time of each exit step and right allowable queue time to use is known.

In summary, the present invention automates the wafer lot order process at gate step of queue time so as to improve manufacturing efficiency, save manpower required to manually order lots and reduce the associated utilization loss percentage and rework percentage due to the non-optimal order of lots. Additionally, the offline simulation evaluates different allowable queue time settings and suggests an optimal one having the utilization loss percentage and rework percentage further reduced. The present invention is different from the prior art known because since none of the prior art known have any mention of the approach of determining allowable queue time based on utilization and rework percentage as disclosed in the present invention.

Furthermore it should be noted that the methods and systems invented are not limited to be applied to semiconductor manufacturing lines, they can be applied to all other manufacturing lines wherein queue time problems have to be considered.

While the invention has been particularly shown and described with reference to the preferred embodiments thereof, it will be understood by those skilled in the art that various changes in form and details may be made without departing from the spirit and scope of the invention.

What is claimed is:

1. A method to establish a wafer lot order of a semiconductor manufacturing line by controlling queue time of wafer lots, comprising the steps of
   (1) ranking lots of semiconductor wafers waiting at gate step of queue time control and ordering said ranked lots on a lot list;
   (2) allocating equipment to an exit step of queue time control and ranking said equipment according to priority on an equipment list;
   (3) selecting equipment having highest priority as current equipment;
   (4) selecting a lot having highest priority;
   (5) checking a resource and process constraint database if said equipment selected is qualified to run said lot selected and if resources required are available and select another equipment as current equipment from said equipment list if said check is negative;
   (6) calculating minimal batch size if the equipment of said exit step is a batch tool;

(7) determining optimal allowable queue time of said lot selected based on utilization loss and rework percentage;
(8) calculating the earliest release time for the equipment selected; and
(9) releasing the lot selected and assigning it to the equipment selected if the current time is not later than the calculated earliest release time otherwise select the next lot on the lot list and go to step (5), if there are no more lots on the lot list go to exit.

2. The method of claim 1 wherein all lots are ranked according their priority.

3. The method of claim 2 wherein said priority is defined using a composite rule of Bottleneck Pull rule and Output Driven rule.

4. The method of claim 1 wherein said allocation of equipment is performed by excluding equipment being down and equipment going to preventive maintenance after finishing lots already assigned to them.

5. The method of claim 1 wherein said ranking of equipment is performed using a wafer move target and available work-in-process, wherein said wafer move target is the difference between target downstream work-in-process required to meet the output target and actual downstream work-in-process.

6. The method of claim 5 wherein an algorithm to perform said ranking is installed in a Computer Integrated Manufacturing System.

7. The method of claim 1 wherein said optimal allowable queue time is determined by offline simulation.

8. The method of claim 7 wherein said offline simulation is performed in different simulation runs with time window constraint and different allowable queue time settings.

9. The method of claim 8 wherein simulated utilization loss percentages and rework percentages are collected for each allowable queue time setting.

10. The method of claim 9 wherein said simulated utilization loss percentages and rework percentages are the basis of an user defined objective function to determine said optimal allowable queue time setting.

11. the method of claim 10 wherein said objective function defines a trade-off between utilization loss percentage and rework percentage, which is determined by Manufacturing and capacity planning providing a high weightage for rework percentage for those queue time steps which can not afford rework and providing a high weightage for utilization loss for those queue time steps with very tight capacity.

12. The method of claim 1 wherein said optimal allowable queue time is determined by online simulation.

13. The method of claim 12 wherein real time work-in-process profiles and equipment states are fed to online simulation model.

14. The method of claim 1 wherein, if an exit step of queue time is a batch process, more than one lot are assigned to a batch and batch priority is equal to the highest priority of the lots belonging to the batch.

15. The method of claim 14 wherein a batching algorithm determines optimal batch size to minimize average waiting cost using information of future lots arrivals.

16. The method of claim 1 wherein said calculation of earliest release time is performed using said optimal allowable queue time and the result of a calculation of a next available time of a equipment selected.

17. The method of claim 16 wherein said calculation of a next available time of an equipment selected comprises steps of:

(1) selecting equipment having highest priority from said equipment list as current equipment;
(2) selecting a lot as current lot from top of a lot list assigned to said current equipment;
(3) checking if arrival time of said current lot is later than said next available time of current equipment and, if the check is positive, defining next available time of said current equipment=said arrival time of the current lot+raw process time of said current lot, otherwise defining next available time of said current equipment=next available time of said current equipment+raw process time of said current lot;
(4) checking if there are more lots on said lot list and, if positive, selecting next lot on the lot list as current lot and go to step (3), otherwise, checking if there are more equipments on said equipment list and, if positive, selecting next equipment as current equipment from said equipment list and go to step (2), otherwise go to exit.

18. The method of claim 16 wherein, in case only one exit tool has to be considered, the earliest release time is calculated using the equation:

earliest release time=next available time of exit tool−raw process time of current lot−allowable queue time.

19. The method of claim 16 wherein, in case the lots have to go to a first exit tool and then a defined second exit tool and queue time constraints exist between both exit tools, the earliest release time is calculated using the equation:

ERT=max(release time 1, release time 2), wherein
release time 1=NAT(ET1)−RPT−AQT1, and
release time 2=NAT(ET2)−AQTL−RPT(1)−RPT−AQT(2),
wherein NAT (ET1) represents the next available time for exit tool1, NAT(ET2) represents the next available time for exit tool2, RPT represents the raw process time of the gate tool, RPT(1) represents the raw process time of exit tool 1, AQT(1) represents the allowable queue time between gate and exit tool 1, and AQT(2) represents the allowable queue time between exit tool 1 and exit tool 2.

20. The method of claim 16 wherein, in case the lots have to go to either a first exit tool or to a second exit tool and queue time constraints exist between gate tool and both exit tools, the earliest release time is calculated using the equation:

ERT=max(release time 1, release time 2), wherein
release time 1=NAT(ET1)−RPT−AQT(1), and
release time 2=NAT(ET2)−RPT−AQT(2),
wherein NAT(ET1) represents the next available time for exit tool 1, NAT(ET2) represents the next available time for exit tool 2, RPT represents the raw process time of the gate tool, AQT(1) represents the allowable queue time between gate and exit tool 1, and AQT(2) represents the allowable queue time between gate and exit tool 2.

21. The method of claim 1 wherein queue time control is performed decentrally between each pair of a gate step and an exit step having time constraints.

22. The method of claim 1 wherein queue time control is performed centrally by one control unit for a manufacturing line as a whole.

23. The method of claim 1 wherein said assignment of a lot to an equipment selected can be modified in case the equipment selected is not available in the meantime until the lot arrives at its exit.

24. A system to establish a wafer lot order of a semiconductor manufacturing line by controlling queue time of wafer lots, comprising:
- means to create a list of all production lots waiting at a gate step of queue time control, wherein said lots are ranked according their priority;
- means to create a list of all manufacturing equipments allocated to exit steps of queue time control, wherein said equipments are ranked according their priority;
- means of a resource and process constraint database, which is used to check if said manufacturing equipments are qualified to run a production lot and if said equipment has production resources required for said lot;
- means to determine optimal allowable queue time by running a simulation with different allowable queue time settings of said production lots considering utilization loss and rework required;
- means to calculate earliest release time for production lots based on said optimal allowable queue time and based on calculated next available time of exit equipment; and
- means to release and to assign production lots to manufacturing equipment.

25. The system of claim 24 wherein said queue time control is performed by a computer decentrally between each pair of a gate step and an exit step having time constraints.

26. The system of claim 24 wherein said queue time control is performed by one computer centrally for the semiconductor manufacturing line as a whole.

* * * * *

UNITED STATES PATENT AND TRADEMARK OFFICE
CERTIFICATE OF CORRECTION

PATENT NO. : 7,610,111 B2 Page 1 of 1
APPLICATION NO. : 11/705636
DATED : October 27, 2009
INVENTOR(S) : Lin et al.

It is certified that error appears in the above-identified patent and that said Letters Patent is hereby corrected as shown below:

Col. 10, line 51, replace "release time 2=NAT(ET2)-RPT-AQT(2)" with -- release time 2=NAT(ET2)-AQT1-RPT(1)-RPT-AQT(2) --.

Signed and Sealed this

Twentieth Day of April, 2010

David J. Kappos
*Director of the United States Patent and Trademark Office*